(12) United States Patent
Baldassara

(10) Patent No.: US 8,430,457 B2
(45) Date of Patent: Apr. 30, 2013

(54) WHEEL BAR AND A WHEEL SPECIALLY ADAPTED THEREFOR

(75) Inventor: Patrick Baldassara, Liverdy (FR)

(73) Assignee: Messier-Bugatti-Dowty, Velizy Villacoublay (FR)

( * ) Notice: Subject to any disclaimer, the term of this patent is extended or adjusted under 35 U.S.C. 154(b) by 47 days.

(21) Appl. No.: 12/604,966

(22) Filed: Oct. 23, 2009

(65) Prior Publication Data
US 2010/0109423 A1 May 6, 2010

(30) Foreign Application Priority Data
Nov. 4, 2008 (FR) ..................................... 08 06126

(51) Int. Cl.
*B60B 19/00* (2006.01)
(52) U.S. Cl.
USPC .......................................... 301/6.2; 188/71.6
(58) Field of Classification Search ............ 301/6.1–6.3, 301/6.8, 6.91; 244/103 R, 111; 188/71.5–71.6
See application file for complete search history.

(56) References Cited

U.S. PATENT DOCUMENTS

| 3,237,731 | A | | 3/1966 | Du Bois |
|---|---|---|---|---|
| 3,958,833 | A | * | 5/1976 | Stanton ........................ 301/6.2 |
| 4,383,594 | A | * | 5/1983 | Correll et al. ............... 188/71.5 |
| 7,051,845 | B2 | * | 5/2006 | Thorp et al. ................ 188/71.6 |
| 7,488,044 | B2 | * | 2/2009 | Scelsi et al. ................... 301/6.2 |
| 7,546,910 | B2 | * | 6/2009 | Thorp et al. ................ 188/71.6 |
| 2005/0264090 | A1 | | 12/2005 | Kaczynski et al. |

FOREIGN PATENT DOCUMENTS

DE 12 66 067 B 4/1968
GB 1 302 216 A 1/1973

* cited by examiner

*Primary Examiner* — Jason Bellinger
(74) *Attorney, Agent, or Firm* — Sughrue Mion, PLLC

(57) ABSTRACT

The invention relates to a bar for an aircraft wheel, the bar comprising an oblong body (2) extended at each end by respective endpieces (4, 5) extending parallel to the body and parallel to each other, the endpieces being offset relative to each other. The invention also relates to a wheel specially adapted to receive such a bar.

3 Claims, 2 Drawing Sheets

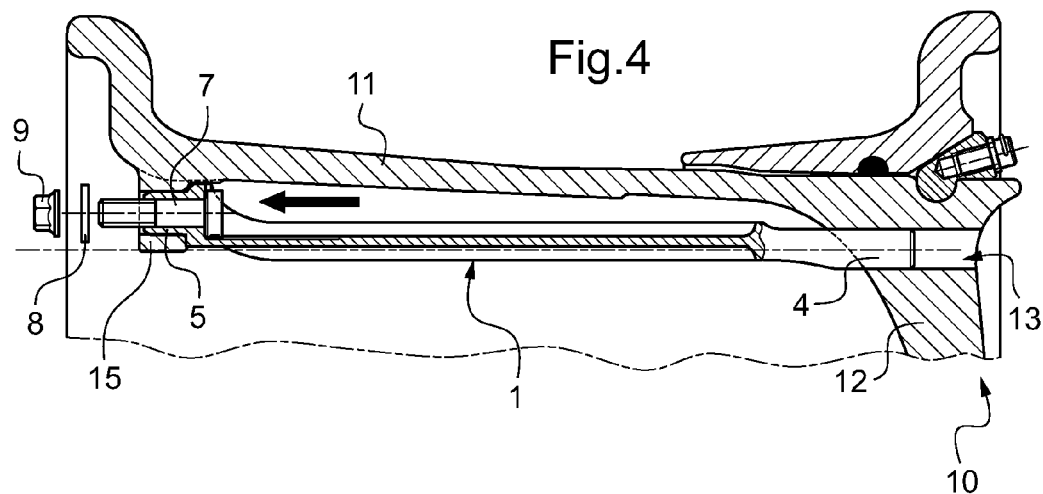
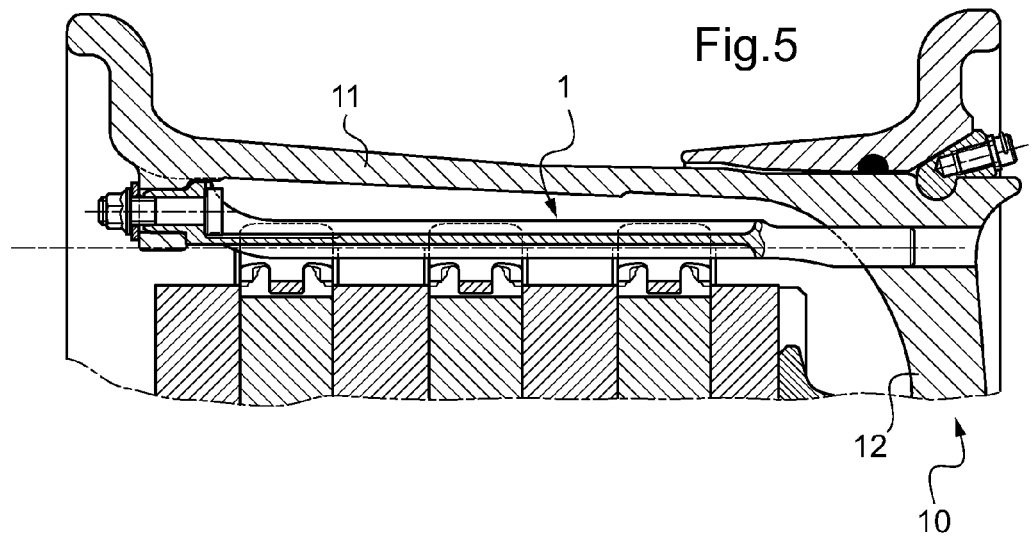

WHEEL BAR AND A WHEEL SPECIALLY ADAPTED THEREFOR

The invention relates to the keys or bars that are fitted to aircraft wheels for the purpose of driving the brake disk(s) that rotate(s) with the wheel, and the invention also relates to a wheel specially adapted to receive such bars.

BACKGROUND OF THE INVENTION

The term "wheel" is used herein to mean an assembly comprising a hub, a disk, and a rim. In aircraft wheels that are designed to co-operate with a brake, an inside volume underlying the rim and defined by the disk serves to receive the disks of the brake. Those of the disks that turn with the wheel, known as rotor disks, generally have peripheral notches that receive bars secured to the wheel for the purpose of driving the disks by the effect of the obstacle connections formed in this way. The bars extend in planes that contain the axis of the wheel, under the rim and close to the inside face thereof.

Several types of bar are known. In some wheels, tenons that are formed integrally with the wheel project under the rim. The tenons receive bars that are essentially of channel-section and that are fitted astride the tenons. That disposition is simple to implement. Nevertheless, the presence of tenons makes machining the inside face of the rim more complicated, since it can no longer be turned.

In other wheels, the bar has a body terminated at a first end by a finger that penetrates into an orifice in the disk, said orifice extending parallel to the axis of rotation of the wheel, and the bar being formed at its opposite end with an orifice that is adapted to receive a screw that extends radially through a tab or a skirt formed integrally with the rim and projecting outwards therefrom, thereby increasing the overall size of the wheel. The bolt fastening the bar contributes to taking up braking forces and therefore needs to be dimensioned accordingly. In addition, the ends of the bars that carry such bolts are exposed, as specified in documents GB 1 302 216 A, U.S. Pat. No. 3,237,731 A, and DE 1 266 067 B.

OBJECT OF THE INVENTION

An object of the invention is to provide a wheel bar of weight that is reduced and that enables the overall size of the wheel that receives the bar to be reduced.

BRIEF SUMMARY OF THE INVENTION

To achieve this object, the invention provides a bar for an aircraft wheel, the bar comprising an oblong body extended at each end by respective endpieces extending parallel to the body and parallel to each other, the endpieces being offset relative to each other. Furthermore, the endpieces are shaped to penetrate in sliding into two parallel orifices that are offset.

Thus, a first endpiece can be inserted in a first matching orifice formed in the disk of the wheel, as occurs with known bars. Thereafter, by turning the bar about said endpiece, the second endpiece is brought into register with a second orifice that is parallel to the first but offset therefrom by an offset that is the same as that between the ends, the second endpiece being formed in a portion of the rim that does not project outwards from the wheel, but that projects radially towards the axis of rotation of the wheel. The overall size of the wheel is decreased correspondingly. It then suffices to move the bar back so that the second endpiece penetrates into the second orifice. The bar is thus put into place on the wheel and all that remains is to fasten the bar, e.g. by means of a nut fitted onto the free end of the second endpiece, or if the second endpiece is designed to be hollow, by means of a bolt received in the second endpiece. In this way, the second endpiece contributes fully to taking up braking forces, such that the nut and the bolt serve only to hold the bar in position, and can therefore be designed to be much smaller, thereby leading to a decrease in weight.

BRIEF DESCRIPTION OF THE FIGURES

The invention can be better understood in the light of the figures of the accompanying drawings, showing in non-limiting manner a particular embodiment of the invention, and in which:

FIGS. 2 to 5 are fragmentary section views through a wheel rim of the invention, showing the various steps in installing the FIG. 1 bar on said wheel.

DETAILED DESCRIPTION OF THE FIGURES

Figure 1:
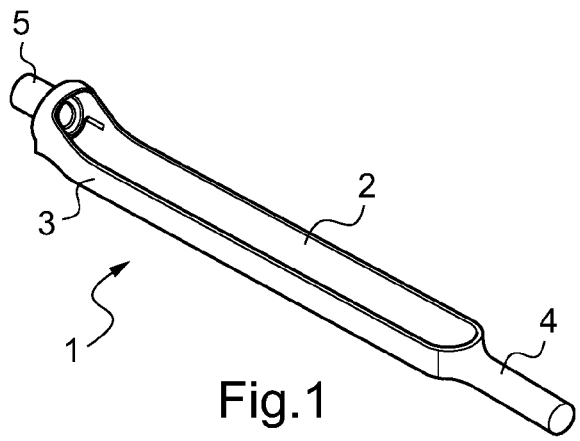
FIG. 1 is a perspective view of a bar in accordance with the invention.

With reference to FIG. 1, the bar 1 of the invention comprises an oblong body 2 made up of two parallel flanks 3 for co-operating with the brake disks that are to be driven (only one of the flanks 3 can be seen). At one of its ends, the bar 1 has a first endpiece 4 that is circularly cylindrical and that extends parallel to the longitudinal axis of the body 2, and in this example is in line with the body. At its opposite end, the bar 1 has a second endpiece 5 that in this example is likewise circularly cylindrical, and it extends parallel to the first endpiece 4, but is offset relative thereto. It can thus be seen that the second endpiece 5 is not in line with the oblong body 2, but is offset therefrom, and is thus also offset from the first endpiece 4. In this example the second endpiece 5 is hollow in order to receive a screw.

The way the bar 1 is mounted is described below with reference to FIGS. 2 to 4. Like known wheels, the wheel 10 that receives the bar 1 of the invention includes a rim 11 that is to receive a tire, and a disk 12 for connecting the rim to a hub that is not shown. The disk 12 includes a first circularly cylindrical orifice 13 adapted to receive the first endpiece 4 of the bar 1. A second orifice 14 for receiving the second endpiece 5 of the bar 1 is provided in a portion 15 of the rim 11 that projects radially from the inside face thereof. The second orifice 14 is naturally parallel to the first orifice 13, and is offset therefrom by the same offset as exists between the endpieces 4 and 5 of the bar 1. It should be observed that this portion 15, here in the form of a tab, does not project beyond the end of the rim 11 and its terminal flange, thereby enabling the overall size of the wheel to be significantly reduced.

Figure 2:
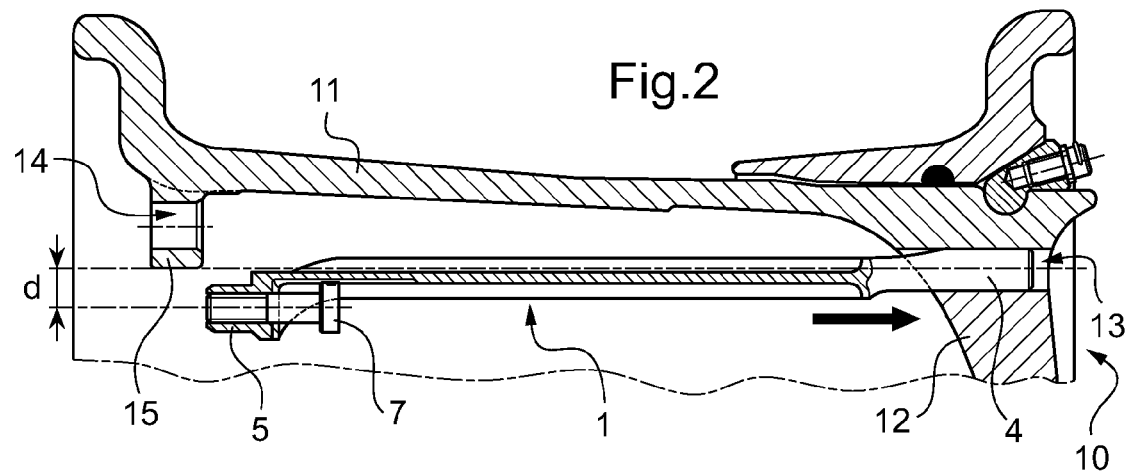
Figure 3:
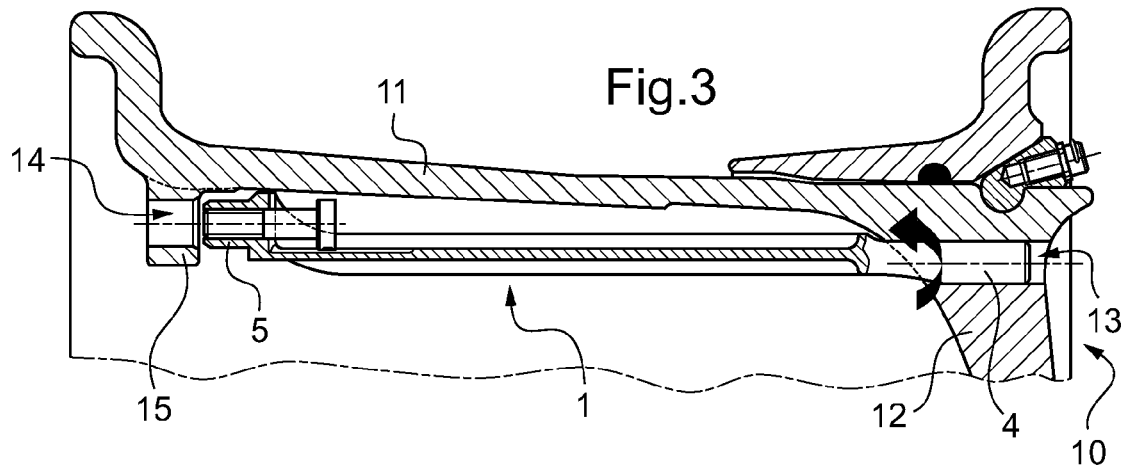

As shown in FIG. 2, the first endpiece 4 of the bar 1 is inserted into the first orifice 13. In this figure, the offset d between the two endpieces can clearly be seen. Then, as shown in FIG. 3, the bar 1 is pivoted about the first endpiece 4 so as to bring the second endpiece 5 (fitted with a screw 7) into register with the second orifice 14. Then, as shown in FIG. 4, the bar 1 is moved back so as to cause the second endpiece 5 to penetrate into the second orifice 14. All that than remains to be done is to cause the screw 7 to advance so as to project beyond the second endpiece 5 so as to enable a washer 8 and a nut 9 to be put into place.

The second endpiece 5 thus takes up braking forces, such that the screw 7 serves only to hold the bar 1 in position on the wheel. The screw 7 is thus much smaller, and therefore lighter in weight than in known bars where the fastener screw (and force take-up screw) extends in a radial direction.

Finally, FIG. 5 shows the wheel in position on a landing gear axle. The associated brake disks can be seen, which brake disks occupy the inside volume of the wheel between the disk 12 and the rim 11. The bar 1 extends in the peripheral notches in the rotor disks in order to cause them to rotate with the wheel.

The invention is not limited to the above description, but on the contrary covers any variant coming within the ambit defined by the claims. In particular, although the first endpiece is shown above as extending the body of the bar, it could be offset relative thereto while also being offset relative to the second endpiece so as to make it possible, by pivoting about the first endpiece, to bring the second endpiece into alignment with the second orifice.

Furthermore, although the second endpiece is shown as being hollow so as to enable it to receive a fastener screw, it is possible to provide other means for fastening the bar. The second endpiece may for example be solid and terminated by a threaded end that is suitable for receiving the fastener nut directly. It is also possible to provide a simple blocking device such as a pin or a resilient ring, should that be strong enough.

What is claimed is:

1. A bar for an aircraft wheel, the bar comprising an oblong body (2) extending along a longitudinal axis and being terminated by first and second endpieces (4, 5) extending parallel to the body and parallel to each other, said endpieces being shaped to slidably penetrate into two corresponding parallel orifices (13, 14) of the wheel;

wherein the first endpiece (4) extends in line with the longitudinal axis of body and is shaped to enable the bar to turn about the longitudinal axis when the first endpiece extends in the corresponding orifice (13), and wherein the second endpiece (5) extends along an axis parallel to the longitudinal axis but radially offset therefrom, the second endpiece, and parallel to the longitudinal axis being hollow and adapted to receive a screw that extends along the axis of the second endpiece.

2. An aircraft wheel adapted to receive a bar (1) according to claim 1, the wheel comprising a rim (11) supported by a disk (12), the wheel having first and second orifices (13, 14) to receive the bar endpieces, the first orifice being formed in the disk, the second orifice (14) being formed in a portion (15) of the wheel that radially projects from an inside face of the rim, so that the second orifice extends parallel to the first orifice and radially offset relative thereto.

3. A method of installing a bar on an aircraft wheel, the bar comprising an oblong body (2) extending along a longitudinal axis and being terminated by first and second endpieces (4, 5) extending parallel to the body and parallel to each other, said endpieces being shaped to slidably penetrate into two corresponding parallel orifices (13, 14) of the wheel, the first endpiece (4) extending in line with the longitudinal axis of the body and shaped to enable the bar to turn about the longitudinal axis, the second endpiece (5) extending along an axis parallel to the longitudinal axis and radially offset therefrom, the second endpiece being hollow and adapted to receive a screw that extends along the axis of the second endpiece;

the wheel comprising a rim (11) supported by a disk (12), and having first and second orifices (13, 14) to receive the bar endpieces, the first orifice being formed in the disk, and the second orifice being formed in a portion (15) of the wheel that radially projects from an inside face of the rim to receive the second endpiece of the bar, so that the second orifice (14) extends parallel to the first orifice and radially offset relative thereto;

the method including:

equipping the second endpiece of the bar with a screw;

engaging the first endpiece of the bar in the first orifices of the wheel;

pivoting the bar around its longitudinal axis so as to bring the second endpiece in register with the second orifice of the wheel;

axially moving the bar back so as to engage the second endpiece into the second orifice of the wheel; and causing the screw to project beyond the second endpiece.

* * * * *